United States Patent Office 3,582,317
Patented June 1, 1971

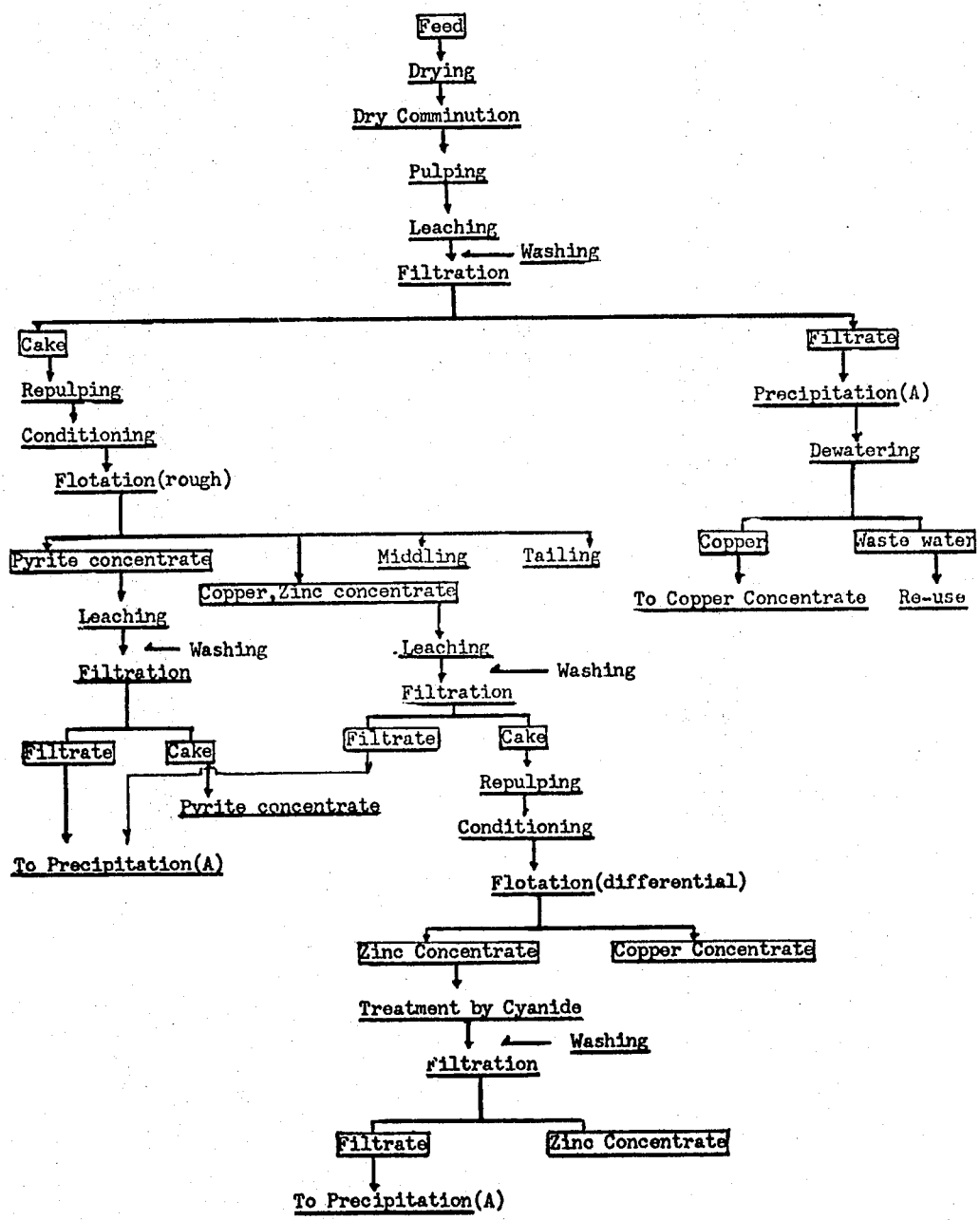

3,582,317
BENEFICIATION OF OXIDIZED OR
WEATHERED SULFIDE ORES
Tatsuichi Gamo, 111-6 Mitsuzaki, Totsuka-ku, Yakahama-shi, Kanagawa-ken, Japan, and Takeshi Furukawa, 958, 1-5, Hoshino-mura, Hayame-gun, Fukuoka-ken, Japan
Filed Dec. 20, 1968, Ser. No. 785,579
Claims priority, application Japan, Dec. 20, 1967,
42/81,141
Int. Cl. C21b 1/08; C22b 15/08, 19/22
U.S. Cl. 75—2                                    7 Claims

ABSTRACT OF THE DISCLOSURE

The beneficiation according to the present invention is carried out by comminuting the starting complex sulfide ore (including so-called black ore), while being concurrently air-dried, the comminuted dry ore is then forthwith pulped, and the pulp is subjected to leaching with e.g. water to leach out water-soluble constituents therefrom. Filtration separates the water-insolubles from the filtrate. Rough flotation separates the filter cake into a pyrite concentrate and a copper and zinc concentrate. The latter is separated into a copper concentrate and a zinc concentrate by differential flotation, following conditioning. Cyanide solubles are removed from the zinc concentrate. Wash waters and filtrates from the leachings are recirculated and re-used.

---

This invention relates to the beneficiation of ores which have been oxidized (or weathered) or are in process of being so oxidized. In general, complex sulfide ore combined with oxides of minerals contained therein and the "Kuroko"—so called black ore which is readily oxidized and weathered—contain copper, zinc, lead, iron, sulfur, nickel, arsenic, molybdenum, bismuth, cadmium, antimony, gold, silver, alumina, calcium, magnesium and manganese values.

A wide variation of beneficiation methods are known in the art. However, the extraction efficiency of prior differential flotation methods applied to oxidized (or weathered) complex sulfide and black ore is considerably inferior to that of the differential flotation of ore composed of fresh sulfide minerals of copper, zinc, lead and iron. The reason is that differential flotation is easily disturbed by the action of copper, zinc or iron ions.

For example, the behavior of copper ion can be explained as follows. All sulfide minerals are activated by copper ion dissolved into water from oxidized copper minerals in the pulp. Particularly zinc sulfide minerals are strongly activated by the copper ion. Even if the various so-called depressors are applied to this complex ore, the depression of zinc sulfides is very difficult. Dissolution of copper iron may be influenced by a change of pH value in the pulp, and also the form of the copper precipitate is related to the pH value (copper oxide, copper hydroxide, copper carbonate, etc.). Thus, recovery of these copper precipitates tends to be rather poor, even if special collectors are used in the flotation of the oxidized ore.

The principal object of the present invention is to provide a method of producing a suitable feed ore for the flotation step by removing completely ions which have a debasing influence on the succeeding beneficiation process.

According to the present invention, the oxidized or weathered ore is first subjected to dry comminution (comminution with concurrent drying). The dry medium is directly or indirectly heated to provide the desired dryness for comminution. Air or inert gas is useful as the heating medium for the drying.

The complex sulfide ore, together with any black ores is then pulped with water immediately after the completion of the comminution operation, and the pulp is then leached to remove water-soluble salts present in the comminuted ore, the conditioned pulp being then filtered and thoroughly washed to provide what may be termed "flotation feed."

Copper concentrate, zinc concentrate and pyrite concentrate are severally recovered from the said flotation feed by flotation, followed by treatment with dilute sulfuric acid or sodium cyanide solution to obtain, respectively, high quality concentrates.

As previously indicated, the comminuted ore, after the "dry comminuation" is pulped immediately and the treatment of the pulp is carried out at neutral pH. To assure complete removal of soluble metallic salts in the first phase of the method according to this invention, the washing of the filtered pulp may be carried out with heated water (30° C. to 90° C.) or with dilute sulfuric acid.

The ore which has been pretreated as aforesaid to eliminate water-soluble salts therefrom is then subjected to succeeding flotation operations. It is advantageous that such flotation can be carried out without troubles due to the presence of water-soluble metallic ion (see description, supra), that almost comparable results to that of the differential flotation of non-oxidized sulfide ores composed of zinc, lead, copper and iron minerals are obtained when this invention is applied to complex sulfide ore which has been oxidized or is under oxidation, and that the method of the invention is effective to avoid chemical reaction due to reaction of copper ion with fine iron powder coming from the comminution mass, etc.

Water-soluble copper and zinc values always remain in the flotation sink containing iron pyrite, when copper, lead and zinc sulfides or copper and zinc sulfides are recovered into froth by differential flotation. The bulk concentrates consisting of two or three minerals are further ground, if necessary, to assure perfect isolation of the constituent minerals, and separation is carried out to obtain two or three concentrates of the respective principal minerals. It is advantageous to use fresh water, hot water or dilute sulfuric acid to wash out water-soluble or acid-soluble metallic ions for increasing the quality of each concentrate after differential flotation. Particularly, significant amounts of insoluble copper in the zinc concentrate can be eliminated by the use of a correspondingly considerable amount of sodium cyanide, after which the sulfide, e.g., chalcopyrite is subjected to xanthate flotation, for example, to yield a high quality copper concentrate.

Any remaining zinc component in the copper concentrate can be dissolved out by ammonia water or aqueous sodium cyanide solution, so that a high grade copper concentrate is obtained.

The following is a detailed exposition of a presently preferred embodiment of the invention.

EXAMPLE

Feed ore consisting of components summarized in Table 1 is treated according to the present invention on the basis of the accompanying flow sheet.

TABLE 1

| | |
|---|---|
| Au (g./t.) | 2 |
| Ag (g./t.) | 8 |
| S (percent) | 39 |
| Cu (percent) | 6 |
| Pb (percent) | 1 |
| Zn (percent) | 5 |
| Fe (percent) | 34 |
| Cd (percent) | 0.01 |
| Bi (percent) | 0.03 |
| Sb (percent) | 0.01 |
| As (percent) | 0.3 |
| $SiO_2$ (percent) | 7 |
| $Al_2O_3$ (percent) | 5 |

The feed ore is crushed to pass through an 8-mesh screen and is concurrently dried in any suitable and per se conventional manner. After being dried for two or three hours at 100° to 200° C., i.e. to constant weight, the dried and coarsely crushed ore is further comminuted, e.g. with the aid of a small ball mill ("dry comminution") to pass through a 150-mesh screen.

The thus finely comminuted ore is used to make a flotation pulp comprising about 30% solid by weight and about 70% liquid (water) by weight. The so-prepared pulp is then agitated in a leaching vessel, provided with a stainless stirrer, for about two to three hours, the said vessel containing sufficient water to dissolve out water-solubles (water-soluble metallic salts) from the pulp. To separate soluble salts from water-insoluble solid substance in the flotation pulp, the latter is filtered to yield a filter cake containing the solids and a filtrate. The filter cake is washed with water at 30° to 90° C. until it is free from water-solubles, the wash water becoming part of the said filtrate.

The caked ore (filter cake) is then repulped with water for so-called "rough flotation." In this way, in addition to middlings and tailings, there are obtained a copper and zinc sulfide concentrate in the bulk froth, and an iron pyrite concentrate in the bottom of the flotation tank ("sink").

The filtrate from the aforementioned filtration is subjected to a precipitation (A) step to precipitate copper values and these are dewatered, the resultant water being recirculated for re-use in the system, and the copper values constitute part of the copper concentrate.

The pyrite concentrate is separately subjected to leaching with a selective solvent in order to remove any undesired constituents, followed by filtration and by washing of the filter cake. The filtrate is recycled to the precipitation A stage for recovery of copper values therefrom. The filter cake constitutes the pyrite concentrate.

The copper and zinc sulfide concentrate is again subjected to leaching with a suitable solvent, depending upon what is to be leached out; this is followed by filtration and by washing of the filter cake. The filtrate from this filtration, together with the washings, is cycled to the precipitation A stage for recovery of copper values therefrom.

The zinc and copper containing filter cake obtained from the last-mentioned filtration is then treated to separate the zinc and copper values. To this end, the filter cake is repulped and conditioned, after which it is subjected to differential flotation, which yields a zinc concentrate on the one hand and a copper concentrate on the other. Undesired constituents, e.g. entrained copper values, are removed from the zinc concentrate by leaching with aqueous sodium cyanide followed by filtration and washing of the filter cake which then constitutes the zinc concentrate. The filtrate from this filtration and washing is returned to the precipitation A stage.

The conditioning of the copper and zinc sulfide concentrate may, if necessary, include treatment with potassium permanganate to promote oxidizing of copper minerals, although other known oxidizing agents may also be used for this purpose. The non-attacked zinc sulfide is then separated from the copper minerals by differential flotation, as aforesaid. Moreover, to decrease copper content in the zinc concentrate, aqueous sodium cyanide can be used. The final zinc concentrate is obtained as shown in the following Table 2.

Cement copper out of solution, which was recovered from each section was combined with the copper concentrate obtained by flotation. Final copper concentrate is also shown in Table 2.

TABLE 2

| Product | Weight percent | Component | | | | Recovery, percent | | | |
|---|---|---|---|---|---|---|---|---|---|
| | | Cu | Zn | Fe | S | Cu | Zn | Fe | S |
| Feed | 100 | 5.75 | 4.22 | 32.24 | 41.08 | 100.0 | 100.0 | 100.0 | 100.0 |
| Copper concentrate | 29.4 | 16.42 | 7.00 | | | 83.9 | 49.1 | | |
| Zinc concentrate | 2.5 | 6.92 | 41.06 | 12.95 | 34.34 | 3.0 | 24.7 | | |
| Pyrite concentrate | 52.5 | 0.48 | 0.32 | 41.67 | 48.32 | 4.4 | 4.0 | 67.9 | 61.7 |
| Tailing | 15.6 | 1.45 | 0.64 | | | 8.7 | 22.2 | | |

In addition the aforesaid copper concentrate (16% Cu in weight) was improved to high quality (23% Cu in weight) by leaching with aqueous sodium cyanide. In this case the percentage of copper distribution was about 42% in weight to total copper of feed. Zinc concentrate was also graded up to 45% Zn in weight from 41% Zn in weight by flotation accompanied with cyanide leaching.

If the extracted copper component from zinc concentrate is added to the copper concentrate mentioned in the above Table 2, resultant copper recovery increases above 85%.

The precipitated material from the combined liquids at precipitation A stage is then de-watered, the resultant waste water being returned to the earlier stages of the process for re-use therein. The residue from the dewatering consists essentially of copper values and these are added to the copper concentrate.

The leaching agents and washing agents are appropriately water, dilute sulfuric acid or aqueous sodium cyanide depending upon the material to be leached or to be washed out.

The pulp density of the aforementioned pulp may vary from 15% to 40% solid by weight. Advantageously the grain size of the solid ranges from 150 to 325 mesh size.

What is claimed is:

1. A beneficiation method for complex sulfide ores alone or together with a black ore, which comprises the steps of subjecting the ore to comminution while the ore is being dried, forthwith pulping the comminuted dry ore, subjecting the pulp to leaching to remove water-soluble salts therefrom, separating the insolubles from the pulp by filtration, separating the thus-obtained filter cake into a pyrite concentrate and a copper and zinc concentrate by flotation, subjecting the last-mentioned concentrate into a copper concentrate and a zinc concentrate by flotation, leaching solubles from the zinc concentrate, and recirculating and reusing filtrates from the several leachings.

2. A beneficiation method according to claim 1, wherein the pulp density is 15% to 40% solid of a 150 to 325 mesh size.

3. A beneficiation process as claimed in claim 1, wherein hot water of temperature of 30 to 90° C. is employed to wash the filtered cake.

4. A beneficiation process as claimed in claim 1, wherein hot diluted sulfuric acid is employed to wash the filtered cake.

5. A beneficiation process as claimed in claim 1, wherein said concentrate is washed with a sodium cyanide solution to obtain a high quality copper, zinc and iron pyrite concentrate.

6. In a method for the beneficiation of oxidized or weathered complex sulfide ores including a black ore wherein the ore is subjected to a first so-called rough flotation for separating the ore into a pyrite concentrate and a zinc and copper concentrate and subsequently to further flotation to separate the latter into a copper concentrate and a zinc concentrate, the improvement wherein the ore is initially subjected to fine comminution while the ore is being dried, the comminuted dry ore is forthwith pulped, and the pulp is subjected to a leaching operation to remove therefrom any water soluble ions which have a debasing influence on the succeeding beneficiation operations.

7. A beneficiation method for complex sulfide ores as claimed in claim 6, wherein said ore is comminuted to the size between 150 and 325 mesh.

References Cited

UNITED STATES PATENTS

| | | | |
|---|---|---|---|
| 2,716,600 | 8/1955 | Frick et al. | 75—2 |
| 2,927,017 | 3/1960 | Marvin | 75—120X |

ALLEN B. CURTIS, Primary Examiner

U.S. Cl. X.R.

75—117, 120